United States Patent
Mistry et al.

(10) Patent No.: US 8,489,137 B1
(45) Date of Patent: Jul. 16, 2013

(54) INTERFERENCE MITIGATION (75) Inventors: Hetal J. Mistry, Herndon, VA (US); PinalKumari K. Tailor, Ashburn, VA (US)

(73) Assignee: Clearwire IP Holdings LLC, Bellevue, WA (US)

(*) Notice: Subject to any disclaimer, the term of this patent is extended or adjusted under 35 U.S.C. 154(b) by 1380 days.

(21) Appl. No.: 12/185,966

(22) Filed: Aug. 5, 2008

(51) Int. Cl.
*H04B 7/185* (2006.01)
*H04B 7/00* (2006.01)
*H04W 72/00* (2009.01)

(52) U.S. Cl.
USPC ........ 455/522; 455/450; 455/435.3; 455/436; 370/318

(58) Field of Classification Search
USPC ............... 455/522, 450, 435.3, 436; 370/318
See application file for complete search history.

(56) References Cited

U.S. PATENT DOCUMENTS

| | | | |
|---|---|---|---|
| 7,363,039 B2* | 4/2008 | Laroia et al. | 455/448 |
| 7,742,781 B2* | 6/2010 | Chen et al. | 455/522 |
| 8,036,676 B2* | 10/2011 | Okazaki | 455/454 |
| 8,150,432 B2* | 4/2012 | Senarath et al. | 455/501 |
| 2002/0177426 A1* | 11/2002 | Ishiguro et al. | 455/296 |
| 2003/0128658 A1* | 7/2003 | Walton et al. | 370/208 |
| 2006/0073791 A1* | 4/2006 | Senarath et al. | 455/67.13 |
| 2007/0225026 A1 | 9/2007 | Bennett | |
| 2007/0281700 A1* | 12/2007 | Deguchi et al. | 455/436 |
| 2008/0274760 A1* | 11/2008 | Senarath et al. | 455/512 |
| 2009/0023466 A1* | 1/2009 | Sutivong et al. | 455/522 |
| 2009/0186621 A1* | 7/2009 | Umeda et al. | 455/446 |
| 2009/0245197 A1* | 10/2009 | Ma et al. | 370/330 |
| 2010/0099449 A1* | 4/2010 | Borran et al. | 455/501 |
| 2010/0216499 A1* | 8/2010 | Senarath et al. | 455/509 |
| 2010/0273426 A1* | 10/2010 | Walley et al. | 455/63.1 |

\* cited by examiner

*Primary Examiner* — Bobbak Safaipour
(74) *Attorney, Agent, or Firm* — O'Brien Jones, PLLC (57) ABSTRACT

Data is transmitted from a first base station using a first sub-channel at a first power level. An indication that a first wireless device is in a potential interference location is received. The first wireless device is receiving data from a second base station. Data is transmitted from the first base station using the first sub-channel at a second power level when a second wireless device receiving data from the first base station on the first sub-channel is associated with an indicator of lower priority. The second power level is lower than the first power level.

16 Claims, 6 Drawing Sheets

INTERFERENCE MITIGATION

TECHNICAL BACKGROUND

Wireless communication may be used as a means of accessing a communication network and has certain advantages over wired communications for accessing a communication network. One of those advantages is a low cost of infrastructure to provide access to many separate mobile devices. To use wireless communication to access a network, a customer device needs to have at least one transceiver in active communication with another transceiver that is connected to the network.

To facilitate wireless communication, the Institute of Electrical and Electronics Engineers (IEEE) has promulgated a number of wireless standards. These include the 802.11 (WiFi) standards and the 802.16 (WiMAX) standards. Likewise, the International Telecommunication Union (ITU) has promulgated standards to facilitate wireless communications. This includes TIA-856, which is also known as evolution-data optimized (EV-DO). The European Telecommunications Standards Institute (ETSI) has also promulgated a standard known a long term evolution (LTE). All of these standards may include specifications for various aspects of wireless communication with a network. This includes processes for registering on the network, carrier modulation, frequency bands of operation, and message formats.

OVERVIEW

A method of operating a communication system is disclosed. Data is transmitted from a first base station using a first sub-channel at a first power level. An indication that a first wireless device is in a potential interference location is received. The first wireless device is receiving data from a second base station. Data is transmitted from the first base station using the first sub-channel at a second power level when a second wireless device receiving data from the first base station on the first sub-channel is associated with an indicator of lower priority. The second power level is lower than the first power level.

A first data stream is transmitted to a first wireless device using a first sector of a first base station and a first sub-channel. An interference indicator comprising information that a second base station is interfering with the reception of the first data stream by the first wireless device is received. A transmit power level of the second base station on the first sub-channel is reduced in response to the interference indicator.

Data is transmitted from a first base station using a first sub-channel in each frame. An indication that a first wireless device is in a potential interference location is received. The first wireless device is receiving data from a second base station. Data is transmitted from the first base station using the first sub-channel in less than every frame when a second wireless device receiving data from the first base station on the first sub-channel is associated with an indicator of lower priority.

DETAILED DESCRIPTION

Figure 1:
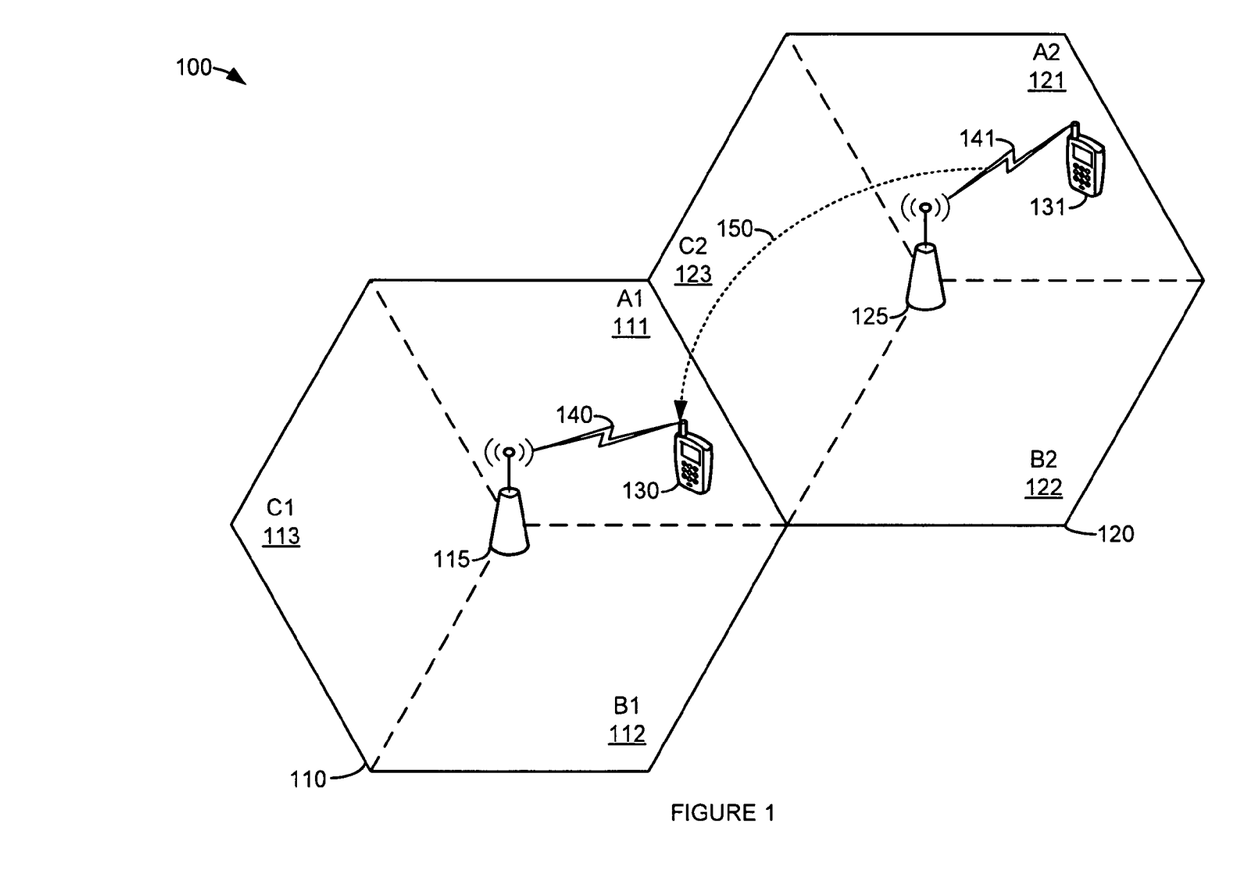
FIG. 1 is a block diagram illustrating a communication system.

FIG. 1 is a block diagram illustrating a communication system. In FIG. 1, communication system 100 comprises service area 110, service area 120, base station 115, base station 125, wireless device 130, and wireless device 131. Service area 110 comprises three sectors A1 111, B1 112, and C1 113. Service area 120 comprises three sectors A2 121, B2 122, and C2 123. Wireless device 130 receives a data stream from base station 115 via wireless link 140. Wireless device 130 is shown in sector A1 111 of service area 110. Wireless device 131 receives a data stream from base station 125 via wireless link 141. Wireless device 131 is shown in sector A2 121 of service area 120.

In FIG. 1, service area 110 and service area 120 are shown as hexagons. Each sector 111-113 and 121-123 of service area 110 and service area 120, respectively, occupies one-third of a hexagon. The sectors in FIG. 1 are shown with the "A" sectors 111 and 121 in the upper right one-third of the service area 110 and 120, respectively. The "B" sectors 112 and 122 are shown in the lower right one-third of service area 110 and 120, respectively. The "C" sectors 113 and 123 are shown in the left one-third of service area 110 and 120, respectively. Also in FIG. 1, sector A1 111 and C2 123 are adjacent and share a common boundary.

Service area 110 illustrates the area serviced by base station 115. Sectors A1 111, B1 112, and C1 113 correspond to areas serviced by different sub-channel groups transmitted from base station 115. Service area 120 illustrates the area serviced by base station 125. Sectors A2 121, B2 122, and C2 123 correspond to areas serviced by different sub-channel groups transmitted from base station 125.

Sub-channels are allocations of frequency and time that base station 115 and base station 125 utilize to communicate with wireless device 130 and wireless device 131, respectively. For example, in a WiMAX specified system, transmissions are divided up into frames. Frames are allocations of transmission times. Each frame is further divided up into allocations of frequency and symbols. Symbols are an allocation of time that is less than a frame. A minimum unit of frequency and time that may be allocated in a frame of a WiMAX specified system may be referred to as a slot. In a WiMAX system, a sub-channel may be a particular allocation of one or more slots. The term "slot" may be applied to other wireless systems. In particular the term "slot" meaning a unit allocation of frequency and time may be used to describe the sub-channels of other system that utilize orthogonal frequency-division multiple access (OFDMA).

In communication system 100, all "A" sectors transmit on the same set of sub-channel groups as all other "A" sectors (e.g., A1 111 and A2 121). All "B" sectors transmit on the same set of sub-channel groups as all other "B" sectors, and so on. Since an "A" sector is adjacent to a "B" sector and a "C" sector, choosing the sub-channel groups to be non-overlapping sets of sub-channels between any "A" sector and any "B" or "C" sector, results in reduced interference between adjacent sectors.

Transmissions from base station 125 to wireless device 131 may interfere with transmissions from base station 115 to wireless device 130. This interference is indicated in FIG. 1 by dashed arrow 150. This interference may be a result of sector A1 111 and A2 121 utilizing the same sub-channel groups. This interference is most likely to occur when wireless device 130 is in a potential interference location.

An example of a potential interference location is when wireless device 130 is near the boundary between service area 110 and service area 120. When wireless device 130 is near the boundary between service area 110 and service area 120, wireless device 130 is relatively far from base station 115. This results in the received signal strength from base station 115 being relatively weak (as compared to other areas of sector A1 111). At the same time, wireless device 130 is relatively near base station 125 (as compared to other areas of sector A1 111). Thus, the interfering signal strength coming from base station 125 transmissions to wireless device 131 (or other devices in sector A2) is also relatively strong.

In an embodiment, to mitigate this interference, communication system 100 may reduce the power level that base station 125 uses on at least one sub-channel when communication system 100 receives and indication that wireless device 130 is in a potential interference location. In particular, communication system 100 may reduce the power level that base station 125 uses to transmit to wireless device 131 on one or more sub-channels that base station 115 also uses to transmit data to wireless device 130. Communication system 100 may restore the power level to its previous level when communication system 100 receives an indication that wireless device 130 is no longer in a potential interference location. In an embodiment, communication system 100 may restore the power level to its previous level after a threshold period of time has passed.

An indication that wireless device 130 is no longer in a potential interference location may be given when wireless device 130 is handed off to a different sector and/or base station. For example, an indication that wireless device 130 is no longer in a potential interference location may be given when wireless device 130 is handed off from sector A1 111 to sector C2 123.

In an embodiment, an indication that wireless device 130 is in a potential interference location may be based on position determining equipment or techniques that determine an approximate location of wireless device 130. In an embodiment, communication system 100 may determine that wireless device 130 is in a potential interference location based on an indicator of RF signal conditions.

In an embodiment, an indicator of RF signal conditions may be based on a signal strength that base station 125 receives from wireless device 130. In an embodiment, an indicator of RF signal conditions may be based on a signal strength that base station 115 receives from wireless device 130. In an embodiment, an indicator of RF signal conditions may be based on a signal strength received from an adjacent sector. For example, the indicator of RF conditions may be based on the signal strength that base station 125 receives from wireless device 130 via sector C2 123.

In an embodiment, an indicator of RF conditions may be a modulation and coding scheme associated with wireless device 130. In an embodiment, the indicator of RF conditions may be based on a received signal strength indication (RSSI). In an embodiment, the indicator of RF conditions may be based on a carrier to interference and noise ration (CINR). The indication that wireless device 130 is in a potential interference location may also be based on other indicators of RF conditions, or combinations, or permutations, thereof.

In an embodiment, communication system 100 may reduce the power level that base station 125 uses on at least one sub-channel when communication system 100 determines that wireless device 131 is associated with an indicator of lower priority than wireless device 130 and wireless device 130 is in a potential interference location. In an embodiment, the indicator of lower priority may be based on an indicator of available resources associated with base station 125. For example, an indicator of available resources may be based on an indicator of available air interface resources associated with sector A2 121. Thus, the decreased throughput that will result when base station 125 lowers its transmit power on one or more sub-channels may be compensated for by allocating available air interface resources to wireless link 141.

In an embodiment, an indicator of lower priority may be based on a type or classification of the traffic flowing to wireless device 131. For example, if wireless device 131 is receiving Http or web browsing traffic, and wireless device 130 is receiving real-time traffic (such as video or voice over internet protocol), then the non-real time nature of the traffic flowing to wireless device 131 would be a basis for associating an indicator of lower priority with wireless device 131.

In an embodiment, an indicator of lower priority may be based on a service flow classification associated with wireless device 131. For example, the traffic flowing to wireless device 130 may be associated with a higher priority service flow classification than the traffic flowing to wireless device 131. These service flow classifications may include wireless traffic classifications. For example, WiMAX wireless communication defines wireless traffic quality of service classifications that include: unsolicited grant service (UGS), real time polling service (rtPS), extended real time polling service (ertPS), non-real time polling service (nRTPS), and best effort (BE).

In an embodiment, the indicator of lower priority may be based on flow classes that include one or more of the differentiated services (DiffServ) per-hop behavior classifications. For example, the traffic flowing to wireless device 130 may be associated with a DiffServ per-hop behavior classification that has higher priority than the traffic flowing to wireless device 131. DiffServ per-hop behavior (PHB) classifications are described in RFC-2474, RFC-2475, RFC-2597, and RFC-3246, which are hereby incorporated herein by reference. These documents are available from The Internet Engineering Task Force at http://www.ietf.org/. DiffServ per-hop behavior classifications may be grouped into an expedited forwarding (EF) group, an assured forwarding (AF) group, a class selector group, and a default group.

Figure 2:
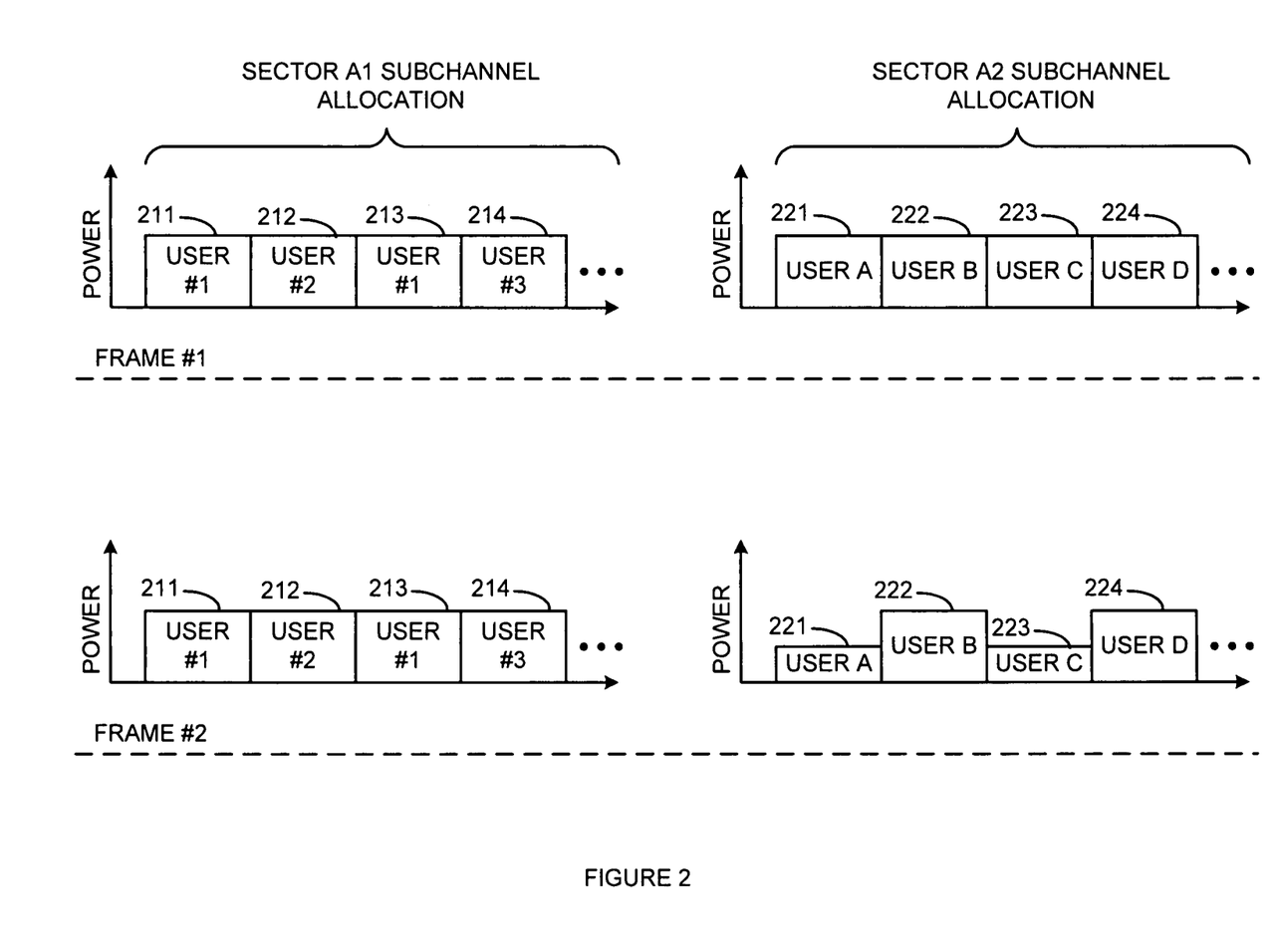
FIG. 2 is a diagram illustrating a reduced sub-channel transmission power level.

FIG. 2 is a diagram illustrating a reduced sub-channel transmission power level. FIG. 2 shows the transmission power by sub-channel for two frames and two sectors. In particular, a transmission power level for sector A1 111 and A2 121 are shown for a frame #1 and a frame #2.

Frame #1 illustrates the transmission power by sub-channel for the case where communication system 100 has not received an indication that wireless device 130 is in a potential interference location. Frame #1 also illustrates the transmission power by sub-channel for the case where communication system 100 has not determined that wireless device 131 is associated with an indicator of lower priority.

The sub-channels 211-214 and 221-224 illustrated in FIG. 2 are allocated to users. Sub-channels 211 and 213 are allocated to user #1. Sub-channel 212 is allocated to user #2. Sub-channel 214 is allocated to user #3. Sub-channel 221 is allocated to user A. Sub-channel 222 is allocated to user B. Sub-channel 223 is allocated to user C. Sub-channel 224 is allocated to user D. Sector A1 111 sub-channel 211 corresponds to the same time and frequency allocation as sector A2 121 sub-channel 221. Sector A1 111 sub-channel 212 corresponds to the same time and frequency allocation as sector A2 121 sub-channel 222, and so on.

In frame #1, each sub-channel 211-214 power level utilized by base station 115 to transmit to the users in sector A1 111 are shown at a first power level. Likewise, in frame #1, each sub-channel 221-224 power level utilized by base station 125 to transmit to the users in sector A2 121 are shown at a first power level. In frame #2, each sub-channel 211-214 power level utilized by base station 115 to transmit to the users in sector A1 111 are shown at the first power level. In frame #2, however, the power levels for sub-channels 221 and 223 are shown at a second power level. This power level is lower than the first power level. Thus, if user #1 is associated with wireless device 130, and user A or User C is associated with wireless device 131, frame #2 illustrates the case where communication system 100 has received an indication that wireless device 130 (i.e., user #1) is in a potential interference location and where wireless device 131 (i.e., user A or user C) is associated with an indicator of lower priority.

Figure 3:
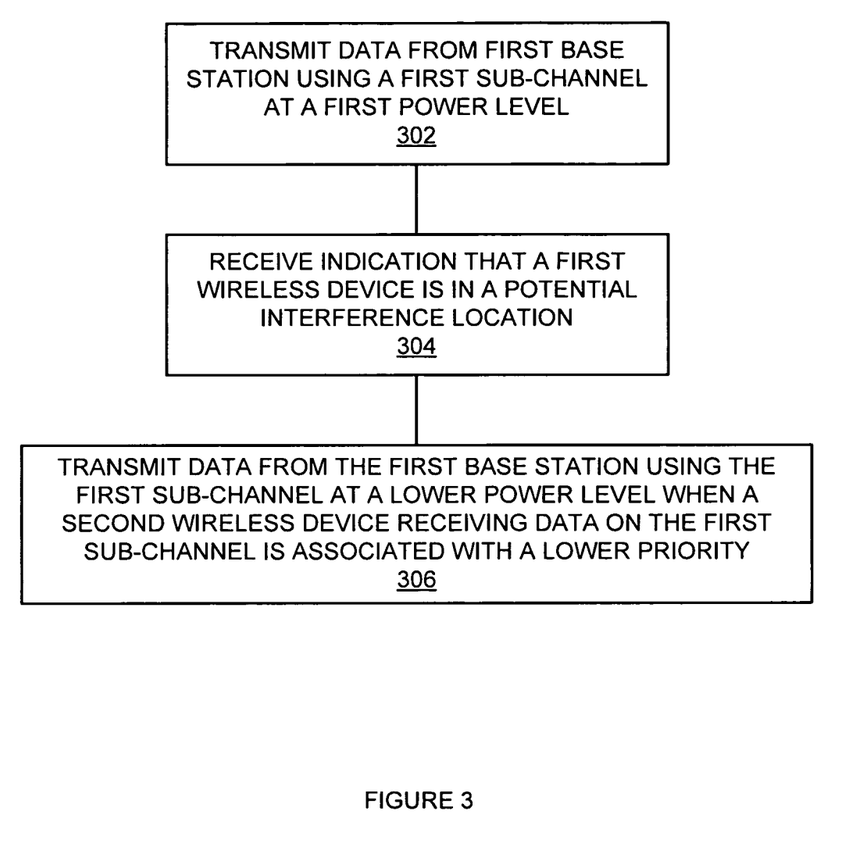
FIG. 3 is a flowchart illustrating a method of reducing sub-channel transmission power.

FIG. 3 is a flowchart illustrating a method of reducing sub-channel transmission power. The steps illustrated in FIG. 3 may be performed by one or more elements of communication system 100.

Data is transmitted from a first base station using a first sub-channel at a first power level (302). For example, base station 125 may transmit data to wireless device 131 using a first sub-channel of the group of sub-channels assigned to sector A2 121 at a first power level. An indication that a first wireless device is in a potential interference location is received (304). For example, base station 125 may receive an indication that wireless device 130 is in a potential interference location.

Data is transmitted from the first base station using the first sub-channel at a lower power level when a second wireless device receiving data on the first sub-channel is associated with a lower priority (306). For example, base station 125 may transmit data to wireless device 131 using the first sub-channel at a lower power level when wireless device 131 is associated with an indicator of lower priority. Since wireless device 130 and wireless device 131 are receiving data on at least one sub-channel that is the same time and frequency allocation, reducing the power level base station 125 uses to transmit data to wireless device 131 may mitigate the interference wireless device 130 experiences.

In an embodiment, communication system 100 may utilize discontinuous sub-channel transmission to mitigate interference when wireless device 130 is in a potential interference location. Base station 125 may use a first sub-channel every frame to transmit data to wireless device 131. To mitigate interference when wireless device 130 is in a potential interference location, and wireless device 131 is associated with a lower priority, base station 125 may transmit data to wireless device 131 using the first sub-channel less than every frame. For example, base station 125 may transmit data to wireless device 131 using the first sub-channel only every $N^{th}$ frame, where N is an integer greater than one.

Figure 4:
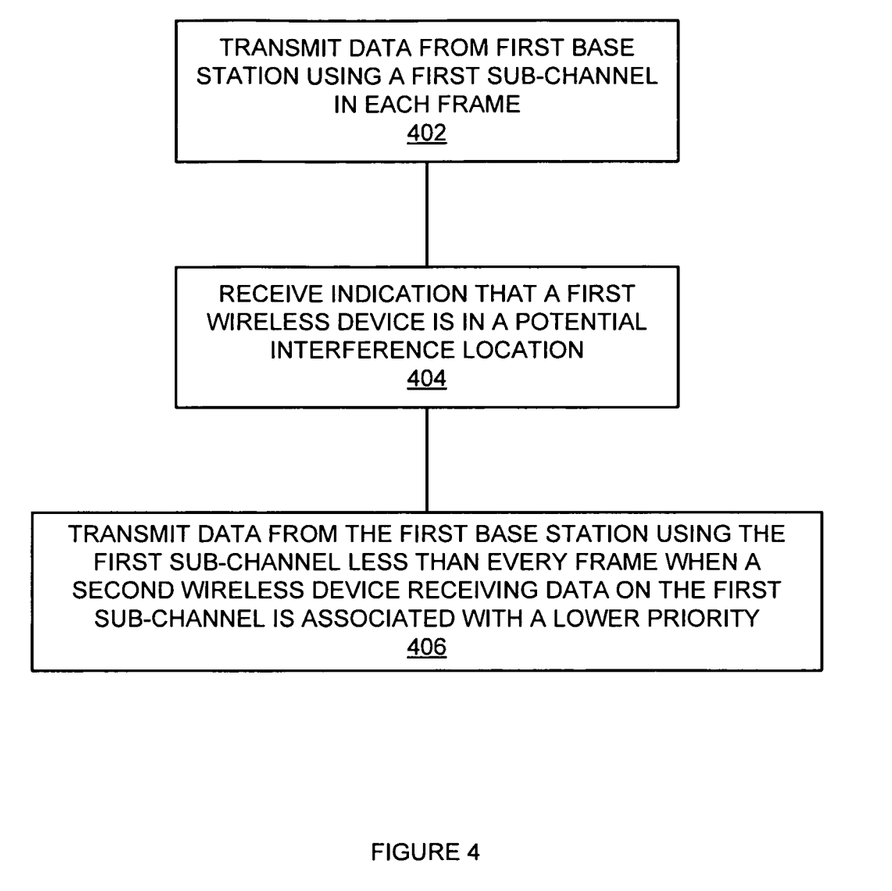
FIG. 4 is a flowchart illustrating a method of discontinuous sub-channel transmission.

FIG. 4 is a flowchart illustrating a method of discontinuous sub-channel transmission. The steps illustrated in FIG. 4 may be performed by one or more elements of communication system 100.

Data is transmitted from a first base station using a first sub-channel in each frame (402). For example, base station 125 may transmit data to wireless device 131 every frame using a first sub-channel of the group of sub-channels assigned to sector A2 121. An indication that a first wireless device is in a potential interference location is received (404). For example, base station 125 may receive an indication that wireless device 130 is in a potential interference location.

Data is transmitted from the first base station using the first sub-channel less than every frame when a second wireless device receiving data on the first sub-channel is associated with a lower priority (406). For example, base station 125 may transmit data to wireless device 131 using the first sub-channel less than every frame when wireless device 131 is associated with an indicator of lower priority. Since wireless device 130 and wireless device 131 are receiving data on at least one sub-channel that is the same time and frequency allocation, periodically eliminating transmission on the first sub-channel by base station 125 may mitigate interference by giving wireless device 130 periodic "interference free" frames.

Figure 5:
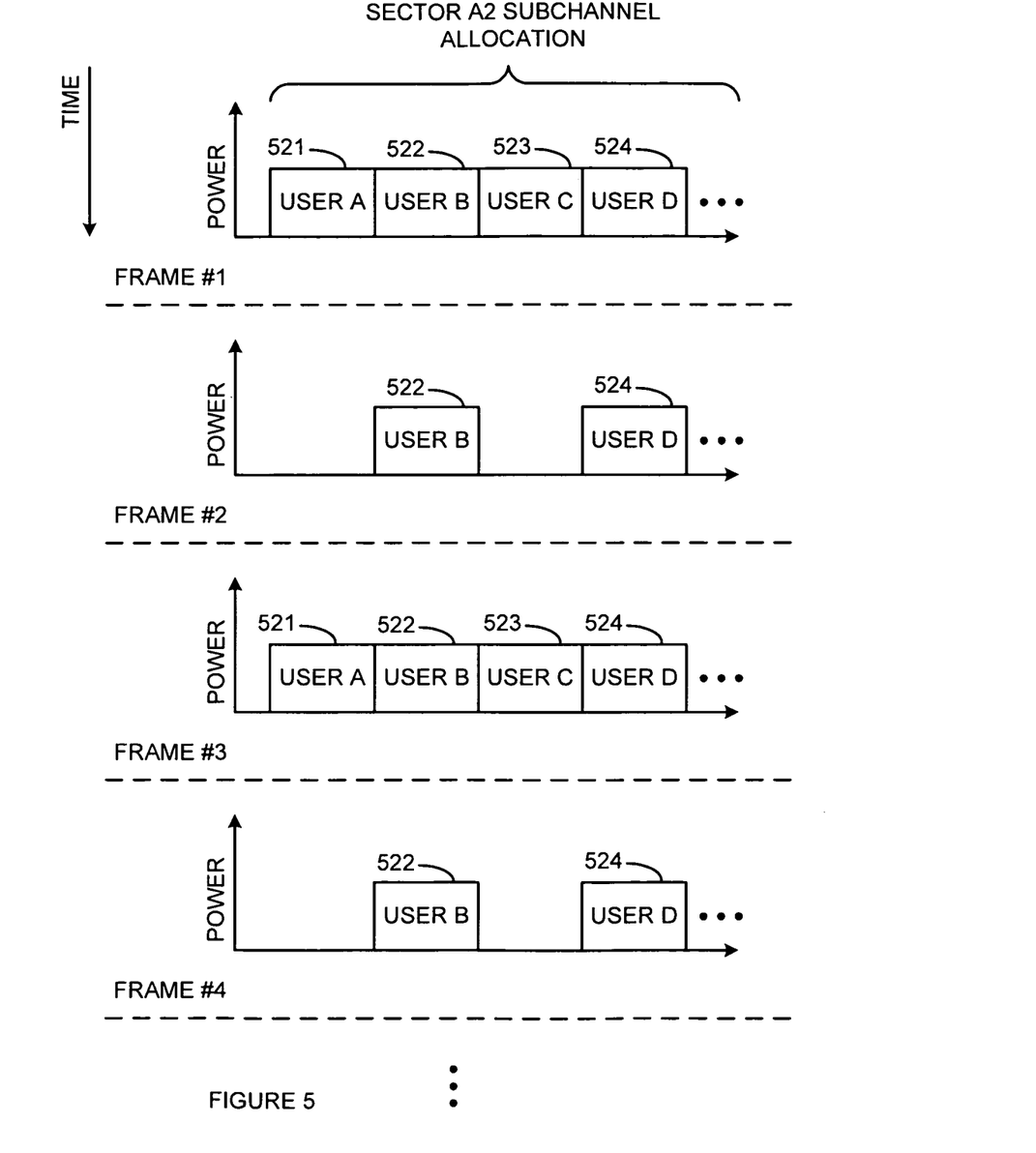
FIG. 5 is a diagram illustrating discontinuous sub-channel transmission.

FIG. 5 is a diagram illustrating discontinuous sub-channel transmission. The sub-channels 521-524 illustrated in FIG. 5 are allocated to users A, B, C, and D, respectively. In frame #1, all of the sub-channels 521-524 are utilized to transmit data to users A, B, C, and D. In frame #2, only sub-channels 522 and 524 are utilized. These sub-channels are utilized to transmit data to user B and user D, respectively. Thus, because no transmission takes place on sub-channels 521 and 523 during frame #2, sub-channels 521 and 523 cannot interfere with a neighboring base station's transmission during frame #2. In frame #3, all of the sub-channels 521-524 are utilized to transmit data to users A, B, C, and D. In frame #4, only sub-channels 522 and 524 are utilized. These sub-channels are utilized to transmit data to user B and user D, respectively. Thus, because no transmission takes place on sub-channels 521 and 523 during frame #4, sub-channels 521 and 523 cannot interfere with a neighboring base station's transmission during frame #4.

The methods, systems, devices, and base stations described above may be implemented with, contain, or be executed by one or more computer systems. The methods described above may also be stored on a computer readable medium. Many of the elements of communication network 100 may be, comprise, or include computers systems. This includes, but is not limited to base station 115, base station 125, wireless device 130, and wireless device 131.

Figure 6:
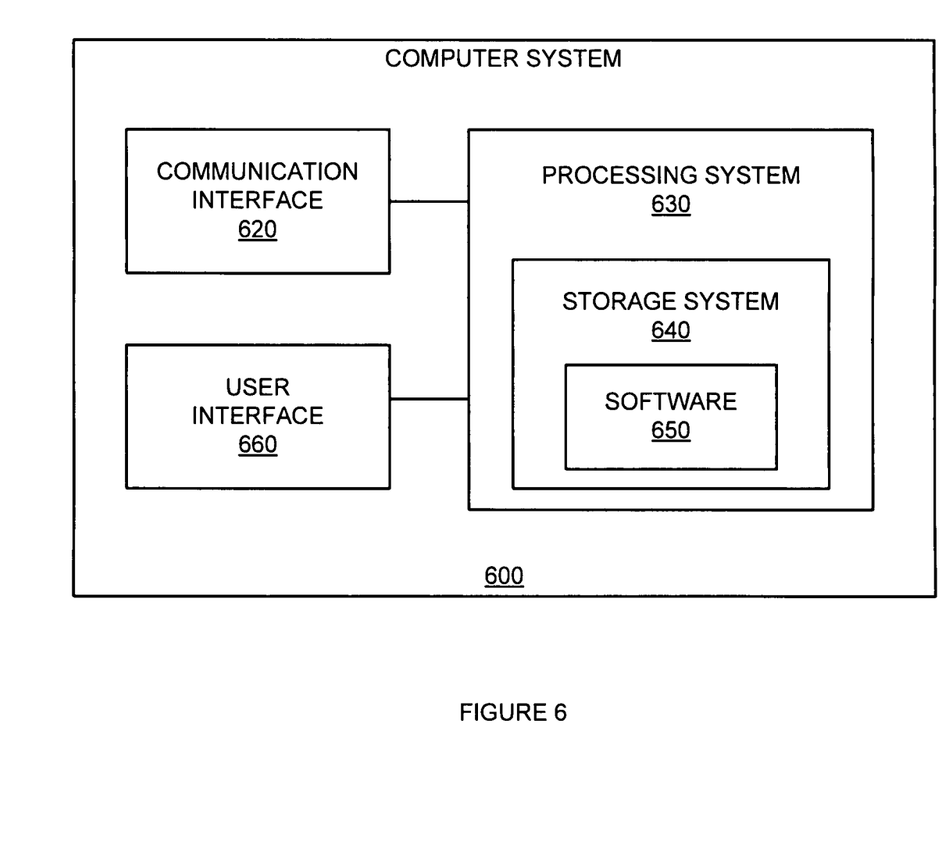
FIG. 6 is a block diagram of a computer system.

FIG. 6 illustrates a block diagram of a computer system. Computer system 600 includes communication interface 620, processing system 630, and user interface 660. Processing system 630 includes storage system 640. Storage system 640 stores software 650. Processing system 630 is linked to communication interface 620 and user interface 660. Computer system 600 could be comprised of a programmed general-purpose computer, although those skilled in the art will appreciate that programmable or special purpose circuitry and equipment may be used. Computer system 600 may be distributed among multiple devices that together comprise elements 620-660.

Communication interface 620 could comprise a network interface, modem, port, transceiver, or some other communication device. Communication interface 620 may be distributed among multiple communication devices. Processing system 630 could comprise a computer microprocessor, logic circuit, or some other processing device. Processing system 630 may be distributed among multiple processing devices. User interface 660 could comprise a keyboard, mouse, voice recognition interface, microphone and speakers, graphical display, touch screen, or some other type of user device. User interface 660 may be distributed among multiple user devices. Storage system 640 may comprise a disk, tape, integrated circuit, server, or some other memory device. Storage system 640 may be distributed among multiple memory devices.

Processing system 630 retrieves and executes software 650 from storage system 640. Software 650 may comprise an operating system, utilities, drivers, networking software, and other software typically loaded onto a computer system. Software 650 may comprise an application program, firmware, or some other form of machine-readable processing instructions. When executed by processing system 630, software 650 directs processing system 630 to operate as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system, comprising:
   transmitting data from a first base station using a first sub-channel at a first power level;
   receiving an indication that a first wireless device is in a potential interference location, wherein the first wireless device is receiving data from a second base station; and,
   transmitting data from the first base station using the first sub-channel at a second power level when a second wireless device receiving data from the first base station on the first sub-channel is associated with an indicator of lower priority, wherein the second power level is lower than the first power level.

2. The method of claim 1, further comprising:
   transmitting data from the first base station using the first sub-channel at the first power level when the indication that the first wireless device is in the potential interference location indicates that the first wireless device is not in the potential interference location.

3. The method of claim 1, wherein the indicator of lower priority is based on an indicator of available resources associated with the first base station.

4. The method of claim 1, wherein the indicator of lower priority is based on a service flow classification associated with the second wireless device.

5. The method of claim 1, further comprising:
   transmitting data from the first base station using the first sub-channel at the first power level after a pre-determined period of time has elapsed.

6. The method of claim 1, wherein the indication that the first wireless device is in the potential interference location is based on RF signal conditions.

7. The method of claim 1, wherein the indication that the first wireless device is in the potential interference location is based on a received signal strength indication (RSSI).

8. The method of claim 1, wherein the indication that the first wireless device is in the potential interference location is based on a carrier to interference and noise ratio (CINR).

9. The method of claim 1, wherein the indication that the first wireless device is in the potential interference location is based on a modulation and coding scheme associated with the first wireless device.

10. The method of claim 1, wherein data is transmitted on the first sub-channel using a first sector of the first base station and the indication that the first wireless device is in the potential interference location is based on a signal strength indicator associated with the first wireless device that is measured by a second sector of the first base station.

11. A method of operating a communication system, comprising:
   transmitting data from a first base station using a first sub-channel in each frame;
   receiving an indication that a first wireless device is in a potential interference location, wherein the first wireless device is receiving data from a second base station; and,
   transmitting data from the first base station using the first sub-channel in less than every frame when a second wireless device receiving data from the first base station on the first sub-channel is associated with an indicator of lower priority.

12. The method of claim 11, further comprising:
   transmitting data from the first base station using the first sub-channel in each frame after a pre-determined period of time has elapsed.

13. The method of claim 11, wherein the indicator of lower priority is based on an indicator of available resources associated with the first base station.

14. The method of claim 11, wherein the indication that the first wireless device is in the potential interference location is based on a received signal strength indication (RSSI).

15. The method of claim 11, wherein the indication that the first wireless device is in the potential interference location is based on a carrier to interference and noise ratio (CINR).

16. The method of claim 11, wherein data from the first base station using the first subchannel is transmitted using a first sector of the first base station and the indication that the first wireless device is in the potential interference location is based on a signal strength indicator associated with the first wireless device that is measured by a second sector of the first base station.

* * * * *